(12) United States Patent
Ross et al.

(10) Patent No.: US 11,059,412 B2
(45) Date of Patent: Jul. 13, 2021

(54) MULTI-CONTAINER SIDE EMPTYING LIQUID CONTAINING DRILL CUTTINGS TRANSPORT TRAILER

(71) Applicant: RECOVER ENERGY SERVICES INC., Calgary (CA)

(72) Inventors: Stan Ross, Cochrane (CA); Willjohn Drschiwiski, Cecil Lake (CA)

(73) Assignee: RECOVER ENERGY SERVICES INC., Calgary (CA)

( * ) Notice: Subject to any disclaimer, the term of this patent is extended or adjusted under 35 U.S.C. 154(b) by 372 days.

(21) Appl. No.: 15/805,609

(22) Filed: Nov. 7, 2017

(65) Prior Publication Data
US 2018/0126894 A1    May 10, 2018

Related U.S. Application Data
(60) Provisional application No. 62/419,236, filed on Nov. 8, 2016.

(51) Int. Cl.
*B60P 3/22* (2006.01)
*B60P 1/16* (2006.01)
(Continued)

(52) U.S. Cl.
CPC .............. *B60P 3/2205* (2013.01); *B60P 1/165* (2013.01); *B60P 3/226* (2013.01); *B60P 3/2245* (2013.01);
(Continued)

(58) Field of Classification Search
CPC ....... B60P 3/2205; B60P 1/165; B60P 3/2245; B60P 3/226; B60P 1/283; B60P 1/286; B60P 1/34; B60P 3/122; B60P 1/24; B62D 21/20; B62D 53/06; B62D 63/068; E21B 21/066; E21B 41/00
See application file for complete search history.

(56) References Cited

U.S. PATENT DOCUMENTS 3,416,684 A * 12/1968 Barry ...................... B60K 1/00
414/339
3,701,443 A * 10/1972 Cornelis Van Der Lely ...............
B60P 1/483
414/546

(Continued)

OTHER PUBLICATIONS

U.S. Appl. No. 15/252,967 to Gregory Steger et al., filed Aug. 31, 2016.

*Primary Examiner* — Minnah L Seoh
*Assistant Examiner* — Marlon A Arce
(74) *Attorney, Agent, or Firm* — Greenblum & Bernstein, P.L.C.

(57) ABSTRACT

A transport trailer and method specifically adapted for safely transporting liquid containing unstabilized drilling waste from more than one waste generator or, multiple waste streams from one or more waste generators. Typically drilling waste is stabilized using binding agents like fly-ash, liquids absorbing pellets or sawdust. In many jurisdictions binding agents are required to stabilize the drill cuttings prior to transport. A sealed transport trailer comprising greater than one container on the transport trailer is described herein which is specifically designed, sized and positioned over a set of axles so as to provide for safe, non-spilling transport, and particular ease of emptying for unstabilized drilling waste.

17 Claims, 8 Drawing Sheets

(51) Int. Cl.
  *B62D 21/20* (2006.01)
  *B62D 53/06* (2006.01)
  *B62D 63/06* (2006.01)
  *E21B 21/06* (2006.01)
  *E21B 41/00* (2006.01)

(52) U.S. Cl.
  CPC ............. *B62D 21/20* (2013.01); *B62D 53/06* (2013.01); *B62D 63/068* (2013.01); *E21B 21/066* (2013.01); *E21B 41/00* (2013.01)

(56) References Cited

U.S. PATENT DOCUMENTS

| | | | | |
|---|---|---|---|---|
| 3,891,106 | A * | 6/1975 | Alcanzare | B62B 1/20 414/425 |
| 4,090,623 | A * | 5/1978 | Noyon | B60P 1/6418 414/391 |
| 4,379,669 | A * | 4/1983 | Wilson | A01D 45/16 414/21 |
| 4,690,608 | A * | 9/1987 | Rasmussen | B60P 1/6418 414/529 |
| 4,826,013 | A * | 5/1989 | Heikkinen | B65F 1/0046 206/518 |
| 5,127,343 | A * | 7/1992 | O'Ham | B09C 1/06 110/233 |
| 5,580,211 | A * | 12/1996 | Mengel | B60P 1/6418 298/11 |
| 6,428,264 | B1 * | 8/2002 | Jensen | B65F 3/201 414/492 |
| 7,360,843 | B1 * | 4/2008 | Rogers | B60P 1/165 298/18 |
| 7,866,756 | B2 * | 1/2011 | Rogers | B60P 1/165 298/17.7 |
| 7,992,942 | B2 * | 8/2011 | Heider | B60P 1/165 298/17.6 |
| 8,087,731 | B1 * | 1/2012 | Rogers | B60P 1/34 298/18 |
| 8,302,986 | B1 * | 11/2012 | Shilts | B60P 3/1033 280/414.1 |
| 9,061,623 | B2 | 6/2015 | MacLean et al. | |
| 9,446,801 | B1 * | 9/2016 | Oren | B62D 33/02 |
| 10,011,209 | B2 * | 7/2018 | Kassian | B60P 1/28 |
| 10,220,758 | B2 * | 3/2019 | Ross | B60P 1/286 |
| 2002/0145328 | A1 * | 10/2002 | Jensen | B60P 1/286 298/18 |
| 2005/0236015 | A1 * | 10/2005 | Goel | E21B 21/066 134/10 |
| 2010/0111655 | A1 * | 5/2010 | Weeks | B60P 1/4421 414/408 |
| 2015/0352996 | A1 * | 12/2015 | Nielsen | B60P 3/42 296/26.11 |
| 2016/0250960 | A1 * | 9/2016 | Ross | B65D 88/126 414/537 |
| 2018/0086245 | A1 * | 3/2018 | Heck | B60P 1/286 |
| 2018/0126894 | A1 * | 5/2018 | Ross | B60P 3/2205 |

* cited by examiner

314  
Unstabilized drill cuttings

315  
Sawdust (stabilizing material)

316  
Stabilized drill cuttings (table 1)

(table 2)

(table 3)

MULTI-CONTAINER SIDE EMPTYING LIQUID CONTAINING DRILL CUTTINGS TRANSPORT TRAILER

CROSS-REFERENCE TO RELATED APPLICATION

The present application claims the benefit under 35 U.S.C. § 119(e) of U.S. provisional application Ser. No. 62/419,236 filed on Nov. 8, 2016, the disclosure of which is hereby expressly incorporated by reference in its entirety.

TECHNICAL FIELD

The field of art to which this invention generally pertains is the transport and processing of drilling waste.

BACKGROUND

During the drilling of a well, gas or oil for example, drilling mud is typically pumped down the drill string through a drill bit. The drilling mud simultaneously cools the bit and carries drill cuttings up the well bore. Drilling mud is typically comprised of a fluid (or fluids), and mixture of additives which can be either fluids or solids, forming a useable drilling fluid. Oil base or brine base drilling fluids are often used to drill oil and gas wells because they have special characteristics that make them a better cooling/carrying fluid than other drilling muds. Additionally, such drilling muds may offer better wellbore stability and/or lubricity for the drill string in modern, horizontal wellbores.

Typically, the drill cuttings which are carried up the wellbore are subjected to solids separating devices when the cuttings exit the wellbore, such as that of shale shakers or decanter centrifuges. These mechanical separators allow a substantial portion of the drilling mud to be returned to the storage tanks for reuse, while the drill cuttings portion is sent to separate storage tanks. The drill cuttings still contain residual amounts of the drilling mud that couldn't be separated through mechanical means, and this residual drilling mud is considered to be contamination.

The drill cuttings are commonly known as drilling waste, because they serve no purpose after they have been removed from the wellbore. Thus, the contaminated drill cuttings are typically stabilized with a bulking agent, such as fly-ash, sawdust, or liquid absorbing pellets, to prevent residual free liquids from leaching from the solids during transport. The cuttings are then typically transported to a secure landfill where they are stored for an indeterminate period of time, typically generations.

With the evolution of new technologies and the increasing cost of drilling fluids, the ability to, and benefits of, reclaiming the lost drilling fluids is increasing. However, technologies such as thermal extraction, solvent washes, or alternate mechanical separators work less effectively, if at all, with bulking agents added prior to shipping.

Typically, stabilized drill cuttings are loaded into open top, sealed end dumps and then moved to a secure waste landfill. A sealed end dump is a large open trailer which allows the material to be moved by loader or excavator into the trailer, while the sealed nature of the end dumping gate ensures any transient liquids that are able to leach from the stabilized drill cuttings, remains in the trailer during transport. A tarp or net is moved over the load to ensure that a minimum amount of moving air is in contact with the stabilized drilling waste, preventing it from becoming airborne and leaving the trailer.

This has proven to be a convenient and economical way to transport stabilized drill cuttings. However, the use of this type of transport trailer, which has become an industry standard for transporting drilling waste, may not be a practical, or jurisdiction dependent, legal way to transport unstabilized drilling waste, especially because of potential safety issues. For example, if bad road conditions, driver error, or other adverse circumstances, contribute to an accident, or cause the trailer to over-turn, the load could easily spill out of the transport trailer onto the ground or otherwise end up in a water-way. The flammable or toxic nature of the oil base or brine base drilling mud contaminating the drill cuttings could cause significant environmental damage or even loss of life.

Thus, the need to transport unstabilized drill cuttings in a safe, efficient manor has arisen.

BRIEF SUMMARY

At least one transport trailer particularly adapted for transporting unstabilized drill cuttings comprising liquids and solids or cleaned drill cuttings substantially void of liquids is described including at least two moon shaped, V-shaped, and/or U-shaped container bodies capable of holding unstabilized drill cuttings comprising liquids and solids or cleaned drill cuttings substantially void of liquids, the body of each moon shaped container being equal to or longer than its width and, and having two side sections uniformly connected through a smoothly transitioning floor section, a front wall section and a rear wall section, each substantially moon shaped container body being able to be tilted along its length around a horizontal access so as to empty the unstabilized drill cuttings comprising liquids and solids or cleaned drill cuttings substantially void of liquids from the container body, each container body being covered with a liquid sealing lid section, the liquid sealing lid section being removably attached to the top of the container body so as to permit ease of filling and emptying of the container body with unstabilized drill cuttings comprising liquids and solids or cleaned drill cuttings substantially void of liquids, at least one frame section of the transport trailer which is attached to and supports each of the substantially moon shaped container bodies, at least two axles attached to the frame section of the transport trailer, where the transport trailer provides stable transport of liquid containing unstabilized drill cuttings comprising liquids and solids or cleaned drill cuttings substantially void of liquids absent leakage, loss or spillage of liquids or solids from the containers during transport or when the containers are in a position other than horizontal and the lid section is closed.

Additional embodiments include: the transport trailer described above having at least three containers on each transport trailer; the transport trailer described above having an internal volume of up to about 9 cubic meters for each container that is attached to the trailer frame; the transport trailer described above configured to contain about 2 to about 3 cubic meters per axle; the transport trailer described above 3 including 2 axles; the transport trailer described above including 3 axles; the transport trailer described above where the container body is removably attached to the axles through rails which allow the container body to empty its load over the side of the transport trailer; the transport trailer described above capable of holding up to the Alberta legal axle load limits of liquid containing unstabilized drill cuttings; the transport trailer described above where the unstabilized drill cuttings are oil base mud drill cuttings or water containing salt base drill cuttings; the transport trailer described above where the axles are positioned so as to provide a substantially equal weight distribution of unstabilized drill cuttings on each axle during transport; and the transport trailer described above including multiple transport trailers connected in series.

A method of transporting liquid containing unstabilized drill cuttings comprising liquids and solids or cleaned drill cuttings substantially void of liquids is also described, including filling the transport trailers described above with unstabilized drill cuttings comprising liquids and solids or cleaned drill cuttings substantially void of liquids, transporting the filled transport trailer to a pre-determined dumping location, and unloading the unstabilized drilling cuttings comprising liquids and solids or cleaned drill cuttings substantially void of liquids from the container(s), without any leakage of liquid from the unstabilized drilling cuttings or cleaned drilling waste during transport.

Additional embodiments include: the method described above where the unstabilized drilling waste contains about 20% to about 50% liquids by volume; the method described above where the transport trailer is filled with unstabilized drill cuttings comprising liquids and solids or cleaned drill cuttings substantially void of liquids up to the Alberta legal axle load limits per axle and Alberta legal weight limit for the total number of axles, for each transport trailer; the method described above where the unstabilized drill cuttings are contaminated with an oil base or brine base mud; the method described above where the unstabilized drill cuttings have been at least partially cleaned using a solvent wash process; the method described above where the unstabilized drill cuttings have been at least partially cleaned using a low temperature thermal process; and the method described above where the transport trailer is used to transport the unstabilized drill cuttings in a first direction and cleaned drill cuttings in a second direction.

These, and additional embodiments, will be apparent from the following descriptions.

DETAILED DESCRIPTION

Figure 1:
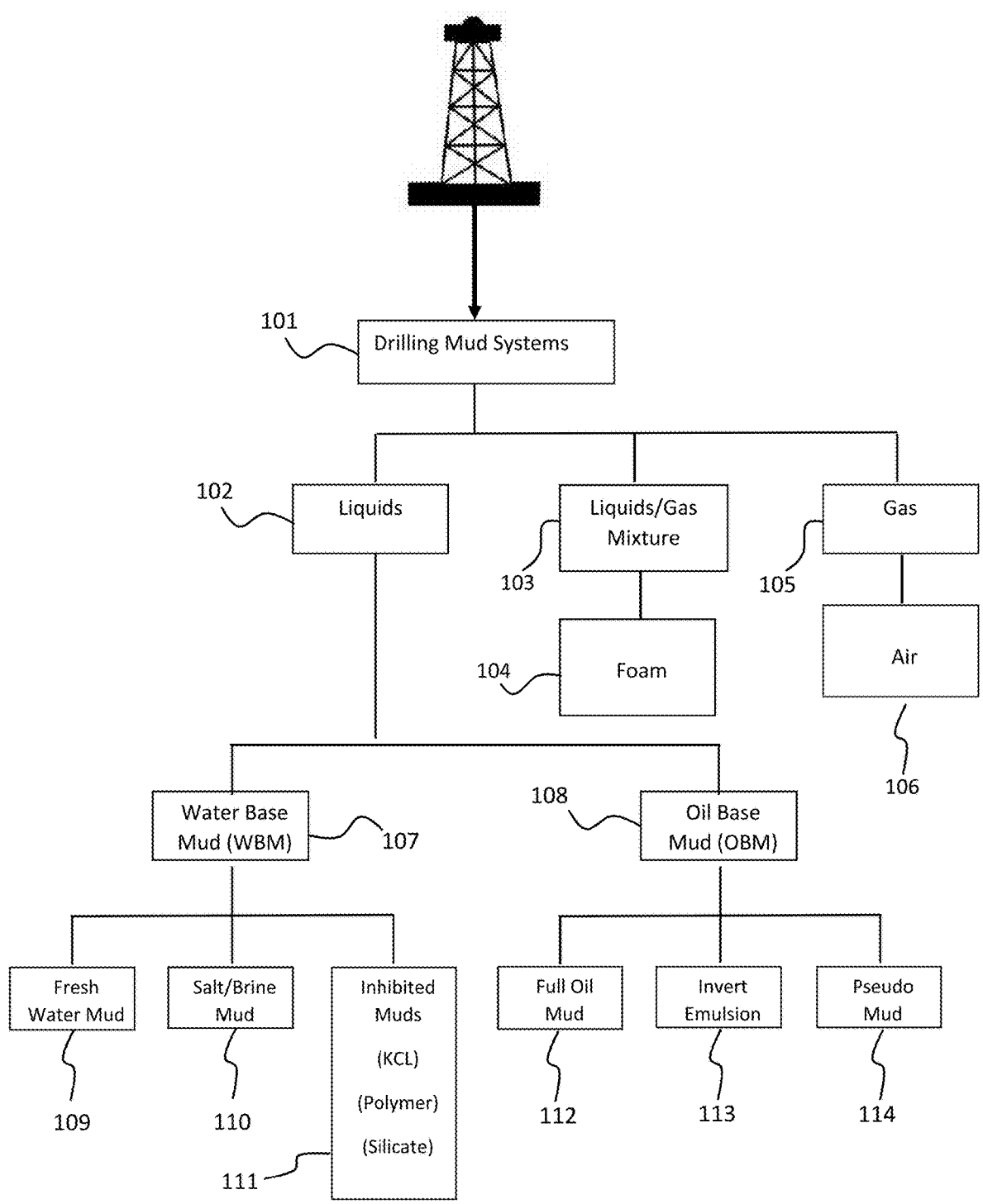
FIG. 1 is a flow chart demonstrating different mud systems which can be used while drilling.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

As mentioned above, without stabilization material, the otherwise wet drill cuttings can readily leach free liquids, which is obviously an unacceptable waste behavior both during transport and at any landfill, or during the unloading process at a waste treatment facility. The cuttings also typically move and behave like a liquid, for example within the transport container, due to the high amounts of oil, water or other liquid on the drill cuttings. On a volumetric basis, the cuttings can contain, between about 20% and about 50% liquid. The unstabilized drill cuttings are typically contaminated with brine base or oil base drilling mud, in amounts significant enough that they would have negative and adverse impact on the environment if not properly treated, or disposed of.

The use of brine base drill cuttings have become more common because they can offer a faster rate-of-penetration when drilling a well. Brine (or formates) base drilling fluids are typically a lower cost than oil base mud systems. Some typical oil base muds use distillate or mineral oil as the base hydrocarbon to build the drilling fluid. While one would think that brine would be considered much friendlier to the environment than oil, it's actually the opposite. The effects of a spill on the environment can be more serious and last much longer, especially on vegetation. Brines (e.g., mixtures of chlorides and water) allow good hole stability and high penetration rates. Oil base muds provide hole stability and lubrication for the drill string itself. This is particularly advantageous for more modern, horizontal wells where lubrication of the drill pipe is essential. However, oil base drilling waste emits an odor and are much harder to remediate than water base drilling waste. That being said, both are a popular form of drilling fluid and the use of brine on an upper section of a well and the use of oil on a lower section of the same well bore is becoming more common. As such, different waste streams can be generated from a single wellbore.

With growing pressure from the public to recycle, or reuse or reduce waste, the oil and gas industry is shifting its focus from managing the liability to treating the liability. Given new treatment technologies are being developed, transport methods must also adapt. However, the previously established transport methods developed will not work to safely move unstabilized drilling waste to a waste treatment facility.

Because of these and other issues, various transport methods for transporting unstabilized drill cuttings have been attempted. One example is a vacuum truck which can self-load unstabilized drill cuttings using negative air pressure until the transport vessel is adequately filled and a maximum legal amount of weight is exhibited per axle. The load is self-contained and can be considered safe for transport. If something should happen to the transport vessel, the vessel is designed so that a minimum to no unstabilized drilling waste comes in contact with the environment. On the downside, the loading process for this type of vessel is very slow, and of course the use of such things as conventional excavators or loaders would be precluded.

Another example is transport vessels specifically designed to transport and unload viscous materials. These vessels include vibration devices and optionally heat, such as hot air, to reduce the surface tension the waste may have on the transport vessel. Vibration is used to remove the viscous or sticky materials. While vibration may help in removing drilling waste from a vessel, hot air would have little to no effect on removing unstabilized drilling waste. The hot air would simply warm the top surface of the drilling waste, and not the bottom section, which is where the drilling waste would adhere to the surface of the transport vessel.

As described in commonly assigned, co-pending U.S. provisional patent application Ser. No. 62/120,546, the disclosure of which is hereby incorporated by reference herein, the bottom sections of the transport vessels can additionally contain one or more heating elements capable of raising the temperature of the drill cuttings at or near the bottom section of the container to a free flowing state for unloading or emptying, for example, when transporting in extremely cold weather. However, investing additional heat energy to facilitate a quicker unloading process is somewhat counterproductive because all heat energy is lost during the term of storage, waiting to be treated at the facility.

Another example is a rectangular cube having a sealed end gate and sealed lid/roof section, all of which are mounted on a loadable skid. The cube allows the lid to be lifted so that jobsite equipment such as a loader or backhoe can load the vessel. The lid and end gate are intended to minimize the unstabilized drilling waste coming into contact with the environment. However, this type of commercially available transport vessel is very heavy due to its larger size, which is necessary for the movement of products having low bulk densities, which is advantageous for higher asset utilization. However, the larger size adversely impacts the amount of low bulk density cargo weight that can be moved on each trip. Also, only specialized trucks equipped with a lifting device can move the transport vessel.

U.S. Pat. No. 9,061,623 describes another example of a transport vessel which consists of a sealed end dump trailer with a sealed lid/roof section. The vessel includes the use of an interconnected baffle system which is connected to the end gate. When the end gate is locked, the baffles are also locked which would prohibit movement of unstabilized drilling waste, for example, which would have a tendency to move from one set of axles to another when the truck is traveling up or down a hill. However, a transport vessel equipped with an interconnected baffle system will suffer similar drawbacks as what is seen in conventional end dump transport vessels; in order to achieve higher asset utilization, the vessel will need to be able to haul a variety of mediums that could have very low bulk densities, thus needing the transport vessel to be a similar size as traditional end dump transport vessels. Further, the interconnected baffle system is only partially successful in keeping the medium from moving from one set of axles to another. In order to ensure the baffle system will swing open when the end gate is unlocked, there must be at least a partial clearance between the wall and each baffle, which is counterproductive to containing fluidic unstabilized drilling waste, thereby changing the weight distributed on each set of axles. Not only is weight redistribution a problem for a driver maintaining a legal load, but if the driver is transporting the load on an icy, muddy, wet or an otherwise challenging road system, weight redistribution can have a severe impact on the drivers ability to maintain control of the truck and transport vessel. The interconnected baffle system can also be a hindrance to the efficiency of the driver because the driver would typically deliberately under-load the transport vessel in anticipation of load movement, thereby reducing the 'pay-load' of each trip, in a best effort to reduce the likelihood of being cited for a weight violation. The interconnected baffle system is a further hindrance when the driver is transporting materials that have a structure that promotes compaction when agitated. Compaction of structured material occurs when the transport vessel is in motion and can cause the material to pack around the interconnected baffle system thereby holding the baffle system tightly in place, even when the transport vessel is moved to an unloading position and the sealed end gate is unlocked. The interconnected design of the baffle system can actually be counterproductive to the unloading process because the sealed end gate is interconnected to a baffle secured in the locked position by the compacted medium. See, for example, U.S. Published Patent Application No. 2014/0353308, the disclosure of which is herein incorporated by reference.

Commonly assigned U.S. patent application Ser. No. 15/252,967 herein incorporated in its entirety by reference, describes a moon shaped container with a sealed lid section and stationary baffle system. The container is hinged to the trailer frame which permits the contents of the load to be tipped over the side of the container section. While the container is in a tipped position, mechanical methods may also be employed to further facilitate cleanout of the container. Given the design includes a stationary baffle, the unstabilized drilling waste is unable to redistribute itself from one axle to another, which would otherwise allow the load to shift on challenging roadways or transportation corridors. However, U.S. patent application Ser. No. 15/252,967 could have some challenging drawbacks in its design including:

i) the combined weight of the container with a lid and its contents, could exert substantial forces upon the frame, king pin and axles when tipping the container section into an unloading position. Such forces have the possibility of fracturing the frame of the transport vessel which is obviously an expensive repair. However, a fracture of the frame could also lead to downstream effects with catastrophic outcomes. For example, if the frame section were to buckle and the container, lid and contents were to fall, they could injure workers interacting with the equipment or, damage the unloading hopper infrastructure, thereby causing a breach in the containment system. Oil or brine fluids breaching the containment system could have irreparable effects on the environment, specifically groundwater; and, ii) When the vessel is unloading, it would be necessary to ensure a dolly-leg or tieback chain is connected from a stationary anchor point, (for example a screw anchor or piling) to the frame of the transport vessel to mitigate the possibility of the vessel overturning while unloading. For the reasons outlined above, the concern of the trailer and truck overturning is of serious concern and every reasonable effort would need to be employed to ensure such an accident is avoided; and, iii) The single vessel design could prohibit the ability for a driver to either segregate, transport and/or unload drilling waste generated from greater than one waste generator, or segregate different types of drilling waste from one or more waste generators during the same trip. This is an economic concern and given the more common use of both water base and oil base drilling fluids during the drilling of a single well, the probability of partial loads being generated will only become more frequent. Given the oil and gas industry is transitioning to treatment technologies, so too is the need to segregate partial loads while unloading at a waste treatment facility.

There is a need to haul smaller load portions from greater than one waste generator at the same time, or haul different types of drilling waste on the same load, or unload the drilling waste in different receiving bins at a waste processing facility, all while maintaining the integrity of the axle weight distribution during transit (for regulatory compliance) and security of the load (to ensure those who share public roadways or transportation corridors are safe, and to ensure the environment doesn't suffer the repercussions of a leaking or breached container).

As described herein, these problems and others in this area are addressed through the use of greater than one container on each transport trailer, or combination of transport vessels.

FIG. 1 is a flow chart of different mud systems (101) used while drilling, including liquids (102), liquid/gas mixtures (103) such as foams (104), and gas (105), such as air (106). The most common mud systems in the liquids category are water base muds (107) such as floc/fresh water (109), or brine/salt (110), and in the oil base mud category (108), full oil mud (112), pseudo mud (114) or oil base/invert emulsion (113). Each type of mud system generates a drilling waste comprised of drilled solids, liquids, and a contaminant which can be a liquid or solid. Some contaminants are more toxic (for example brine or oil), while others produce contaminants that are less toxic (for example polymer systems), and in some cases, no toxicity whatsoever (for example, fresh water muds). In many North American regulatory jurisdictions, anything that comes out of a well bore is considered drilling waste.

Figure 2:
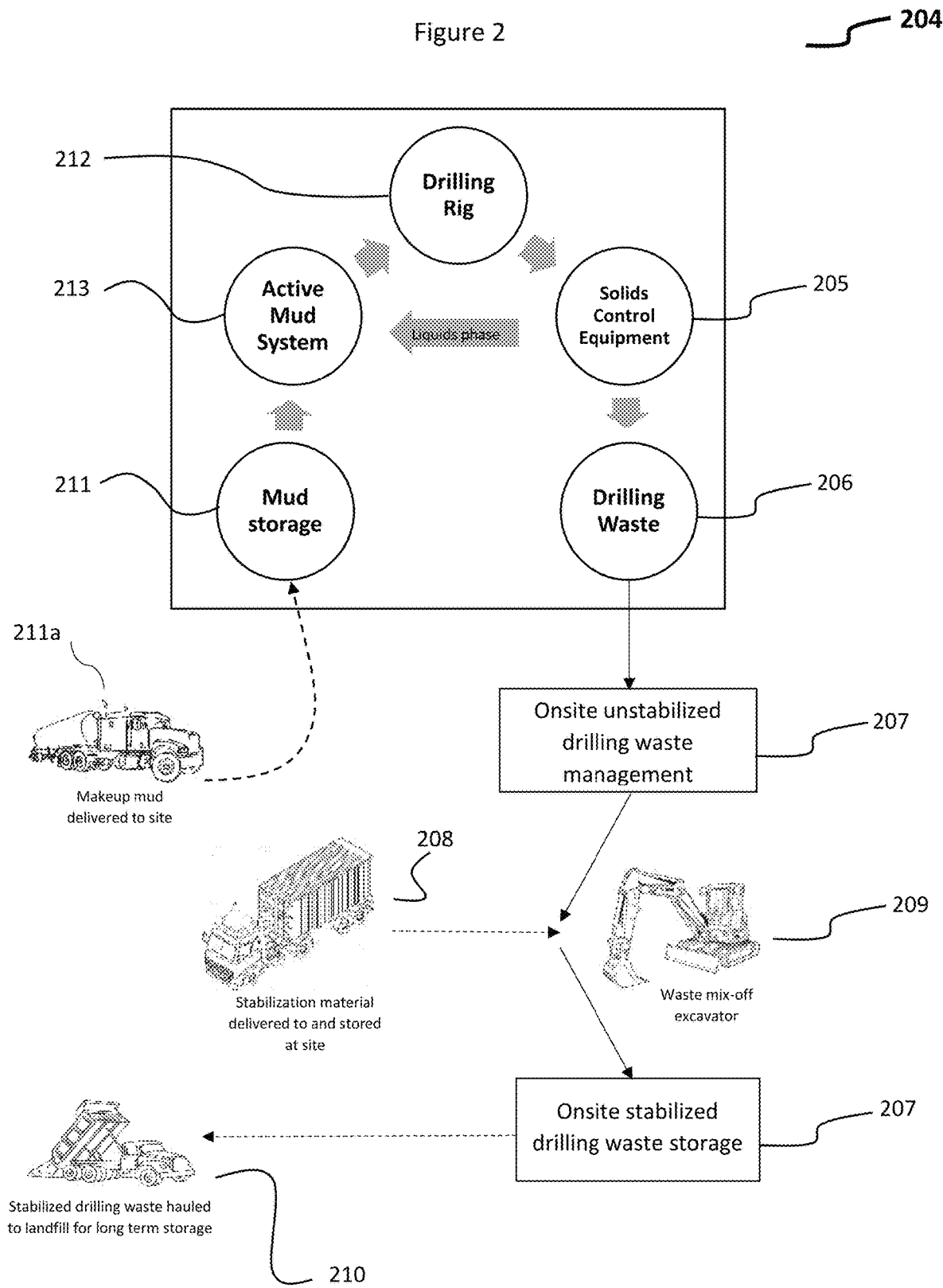
FIG. 2 is a flow chart illustrating an example of how drilling waste is typically managed by waste generators on a drilling site.

With a lack of cost efficient remediation methods for drilling waste, more effort has been focused on managing the liability by storing the waste stream at specialized landfills. FIG. 2 is a flow chart illustrating how drilling waste has traditionally been managed by waste generators at a drill site (204). Drilling waste (206) is harvested from the onsite solids control equipment (205) and stored for short time periods in three or four sided bins (207), mixed with a bulking or stabilizing agent (208) so it doesn't leach free liquids during transit. Thereafter, the drilling waste is loaded using a loader or excavator (209) in conventional trailers and hauled to a landfill (210) for long term disposition. Makeup drilling mud (211) is brought out to the drilling rig (212) and as needed, added back into the active mud system (213) (makeup mud shown delivered to the site as 211*a*).

Figure 3:
FIG. 3 is an example of drilling waste in different states.

FIG. 3 is a photograph of drilling waste in three different states. The drilling waste (314) is harvested from onsite solids control equipment (205) and mixed with a bulking or stabilizing agent (315). The stabilized drilling waste (316) is then ready for transport to a landfill (210).

Figure 4A:
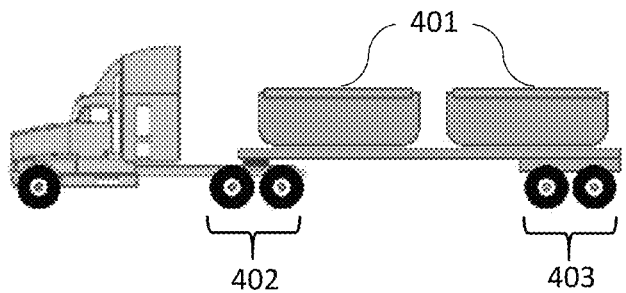
FIGS. 4a, 4b, 4c, 4d and 4e illustrate various axle configurations, useful in the methods and apparatus described herein.
Figure 4B:
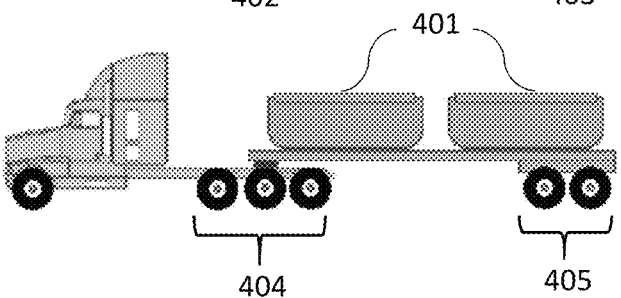
Figure 4C:
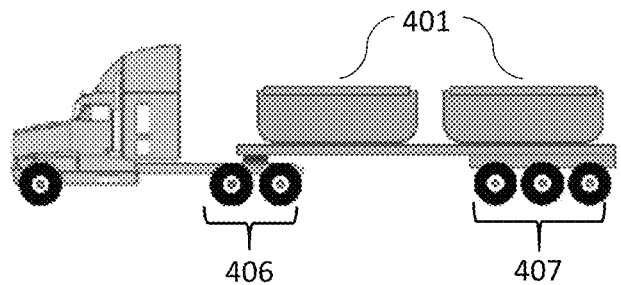
Figure 4D:
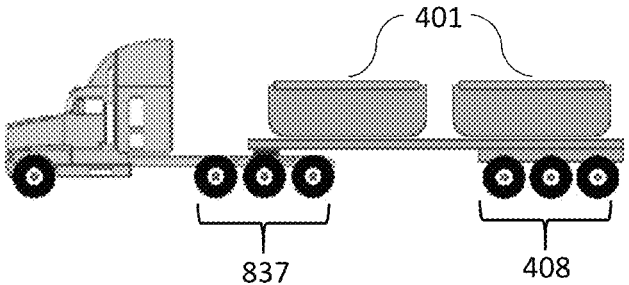
Figure 4E:
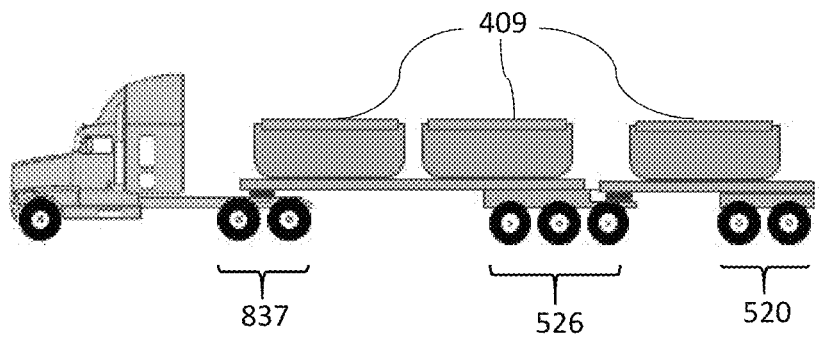
Figure 5:
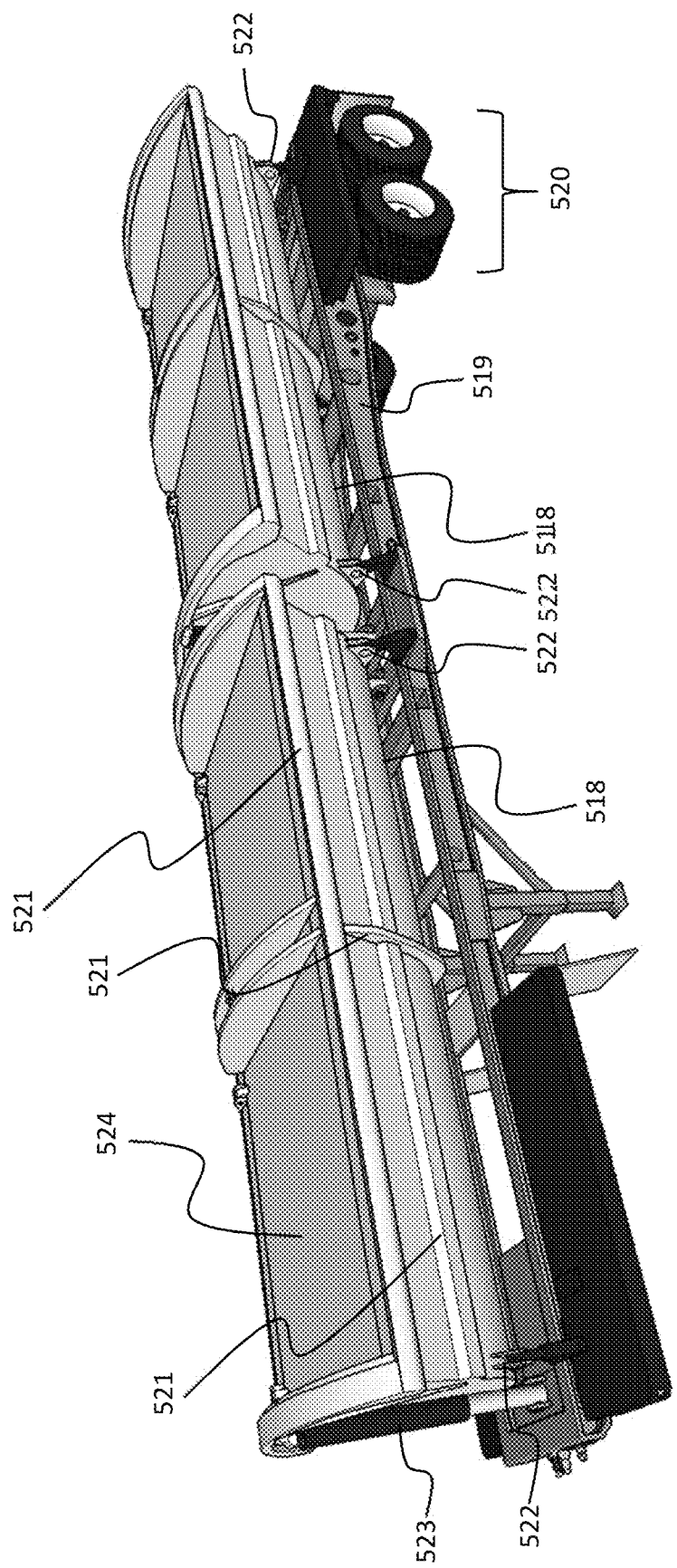
FIG. 5 is an illustration of an embodiment of a sealed multi-container side dump vessel as described herein.

FIGS. 4*a* through 4*e* show different axle configurations, relevant to Tables 1 through 4. FIG. 4*a* shows a two container (401), tandem-tandem axle configuration (402 and 403) embodiment; FIG. 4*b* shows a two container (401), tridem-tandem axle configuration (404 and 405) embodiment; FIG. 4*c* shows another version of a two container (401), five axle tandem-tridem axle configuration (406 and 407) embodiment; FIG. 4*d* shows a two container (401), tridem-tridem axle configuration (837 and 408) embodiment; and FIG. 4*e* shows a three container (409), tandem-tridem-tandem axle configuration (837, 526 and 520) embodiment, more commonly known as a B-train or Super-B-train.

FIGS. 5 through 8 are illustrations of sealed multi-container side dump containers as described herein.

The sealed multi-container side dump trailer (517) is comprised of greater than one container (518) mounted to a frame (519) with two or more axles (521), capable of safely and economically transporting unstabilized drilling waste. Each container is built like that of a substantially moon shaped (classic semi-circular cross section, or substantially U-shaped or V-shaped) container (518) reinforced where necessary to provide container rigidity (521). The container is removably attached to the frame by means of hinges (522) which provide a pivot point for each container, when the hydraulic lifting cylinder (523) is activated to cause each container to transition to a tipped position. The container also includes a removably attached sealed lid section (524) which can be flat or arched to prevent the drilling waste cargo from sloshing about during transit, or blowing out of the container due to the wind induced during travel, or accidental release during an incident.

Each container section can be as little as 3 meters long or less, or 6 meters long or more and substantially moon shaped. That said, the length and width of each moon shaped container is only critical insofar as to consider:

a) the overall volumetric capacity (and resulting weight of the volume) within each container, as far as the weight pertains to legal axle loading; and, b) the inability of the drilling waste to move from a container, thereby redistributing weight from one set of axles for example, from the trailer axles (e.g., 520) to the truck axles (e.g., 837) or visa versa, so as not to exceed the legal axle loading permitted on roadways or other transportation corridors and, minimizes the adverse control of the transport trailer caused by the load shifting on challenging roadways or transportation corridors.

The tables below show three different axle (see FIGS. 4a-4e) configurations, estimated trailer weights and legal axle loading in at least one jurisdiction in North America, from which one can determine the permitted cargo volume in cubic meters.

TABLE 1

(FIG. 4a)

|  | Tandem Truck | Tandem Trailer |
|---|---|---|
| Basic unit weight | 10000 kgs | 8000 kgs |
| Allowable axel loading | 23000 kgs | 17000 kgs |
| Available cargo | 13000 kgs | 9000 kgs |
| Volume equivalent | 13000/1850 = 7 cubes | 9000 kgs/1850 = 4.8 cubes |
| Meters$^3$ per axel | 2.34 | 2.4 |

TABLE 2

(FIG. 4d)

|  | Tridem Truck | Tridem Trailer |
|---|---|---|
| Total unit weight | 11000 kgs | 10000 kgs |
| Allowable axel loading | 30000 kgs | 24000 kgs |
| Available cargo | 19000 kgs | 14000 kgs |
| Volume equivalent | 19000/1850 = 10.3 cubes | 14000 kgs/1850 = 7.6 cubes |
| Meters$^3$ per axel | 2.5 | 2.5 |

TABLE 3

(FIG. 4e)

|  | Tandem Truck | Multi-Trailers** |
|---|---|---|
| Total unit weight | 10000 kgs | 15000 kgs |
| Allowable axel loading | 23000 kgs | 40000 kgs |
| Available cargo | 13000 kgs | 25000 kgs |
| Volume equivalent | 13000/1850 = 7 cubes | 25000 kgs/1850 = 13.5 cubes |
| Meters$^3$ per axel | 2.34 | 2.7 |

**Super-B Train configuration used in calculations

TABLE 4

|  | Alberta Legal axel Loading | British Columbia Legal axel Loading |
|---|---|---|
| Truck - steering axel | 6000 kgs | 6000 kgs |
| Truck - tandem drive axels | 17000 kgs | 17000 kgs |
| Truck - tridem drive axels | 24000 kgs* | 24000 kgs |
| Trailer - tandem axels | 17000 kgs | 17000 kgs |
| Trailer - tridem axels | 24000 kgs | 24000 kgs |

*if tridem drive axels are between 2.4-2.8 m (center front/center rear) then legal axel loading is reduced to 23000 kgs Volumetrically, the cumulative volume of all containers would be approximately equal to or less than 3 cubic meters per axle.

Generally, 3 cubic meters of volume per axle is more volume (and weight) than what would be needed for a two axle truck and trailer combination hauling unstabilized drill cuttings, because the bulk density of the unstabilized drill cuttings is typically 1300 kilograms/cubic meter to about 2400 kilograms/cubic meter, more typically about 1600 kilograms/cubic meter to about 2100 kilograms/cubic meter, and most typically 1850 kilograms/cubic meter. A driver would be responsible for loading each container (518) of the transport trailer (517) until such time that the axles (e.g., 520 and 837) are carrying a legal, recommended, or desired amount of weight. Calculating the weight on each set of axles (e.g., 520 and 837) is the responsibility of the driver and is done by either visual estimation of the volume of the unstabilized drill cuttings, multiplied by the bulk density or, onboard electronic weight indicators or more typically, observing the pressure gauge connected to the airbags (not shown) of the axles which allow the driver to load the transport vessels up to a certain pressure, the driver can estimate the weight of each set of axles.

As described above, and shown in the figures, the container is sized so as to properly distribute the weight of the cuttings over each set of axles, eliminating the need for interconnected baffles, or other adjustments, to provide for stable transport of the cuttings. This, coupled with the sealed lid section (524), provides for spill free, stable transport, even if the transport vessel is being moved over a challenging roadway or transportation corridor.

The bottom, walls and sealing lid can all be made of typical materials (for example, metal), used in transport vehicles. The sealing materials used around the edges of the sealing lid (524) are typically sealing plastic or rubber (525), for example. Any material which prevents or inhibits the leakage of liquid materials can be used. The seal (525) can be molded, mechanically attached, or glued to the underside of the lid so as to accomplish the required liquid sealing. While the width or thickness of the rubber material, for example, could match the thickness of the sealing lid, it would not necessarily be so. Again, the point is to attain liquid leakage prevention, so any width and thickness which accomplishes this objective can be used. Adding the rubber seal (525) to the underside of the lid section (524) will generally prevent damage to the seal during the course of normal use. Given the seal (525) comes to rest along a generally flat metal sealing area] (631) of the container body, the flat sealing section can easily be cleaned with a pressure washer or scraper, without worry about damaging the flat steel area.

The thickness of the walls and sealing lid can vary, for example, from as little as ¼ inch to greater than a ½ inch thick or more. The moon shaped bottom or floor of the vessel would typically be made of ¼ inch plate steel to prevent the load from damaging the transport trailer (i.e., unlikely to cause wash-boarding between the cross members).

As demonstrated in FIGS. 5 through 8, the trailer (517) equipped with greater than one substantially moon shaped containers (518) is pulled in this example by a tandem drive axle truck (826). The sealing lid (524) is removably attached to the body of the container (518) by means of hinges (522) along one wall of the container. Given the embodiment describes the use of more than one container on a trailer frame, and given the volume of the container is generally at maximum, capable of hauling a full legal load, there is no need for one or more baffles of any design (for example, utilizing hinges or interconnected bars from baffle to baffle or gate style baffles). Lacking any baffle infrastructure will either reduce the weight of the transport trailer (517), allowing for more cargo to be carried on each trip, or be similar to a larger single compartment (as opposed to a multiple of smaller containers), either of which is satisfactory to the driver. Thus, when the transport trailer (517) is moving up or down a hill, movement of the semi-fluidic drilling waste is restricted from moving from the drive axles (e.g., 837) of the truck to the rear axles of the trailer (e.g., 520), or visa versa, depending on the grade of the roadway.

Figure 7A:
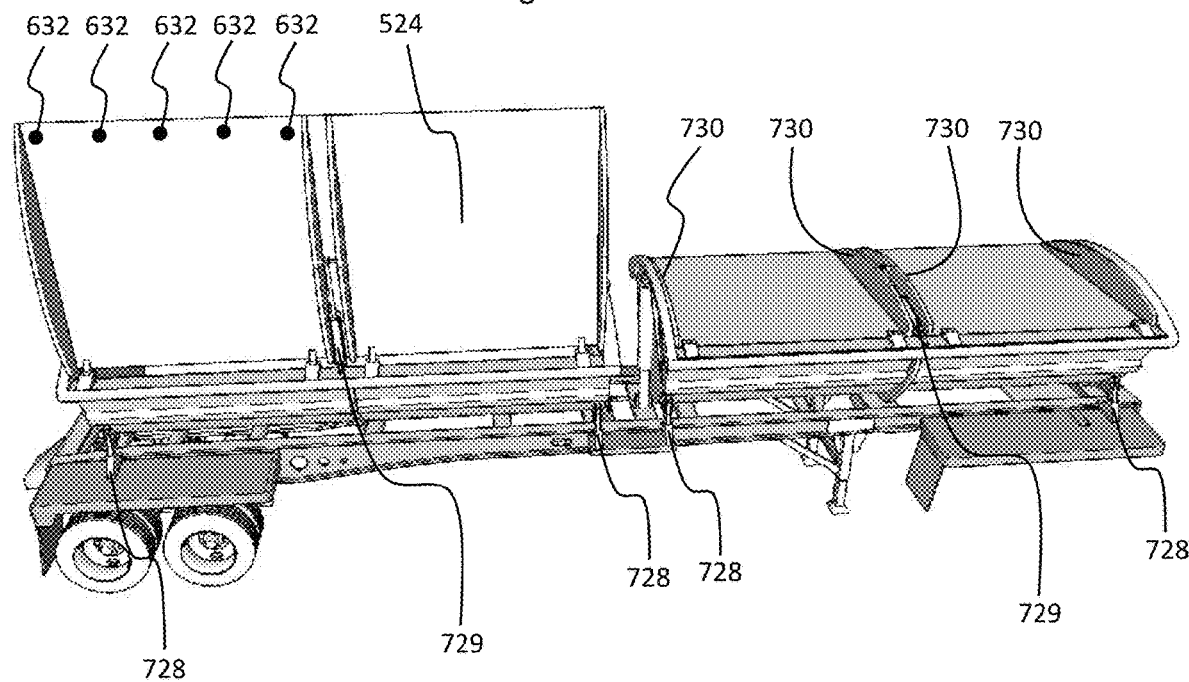
FIGS. 7a and 7b are illustrations of an embodiment of a sealed multi-container side dump vessel as described herein.
Figure 7B:
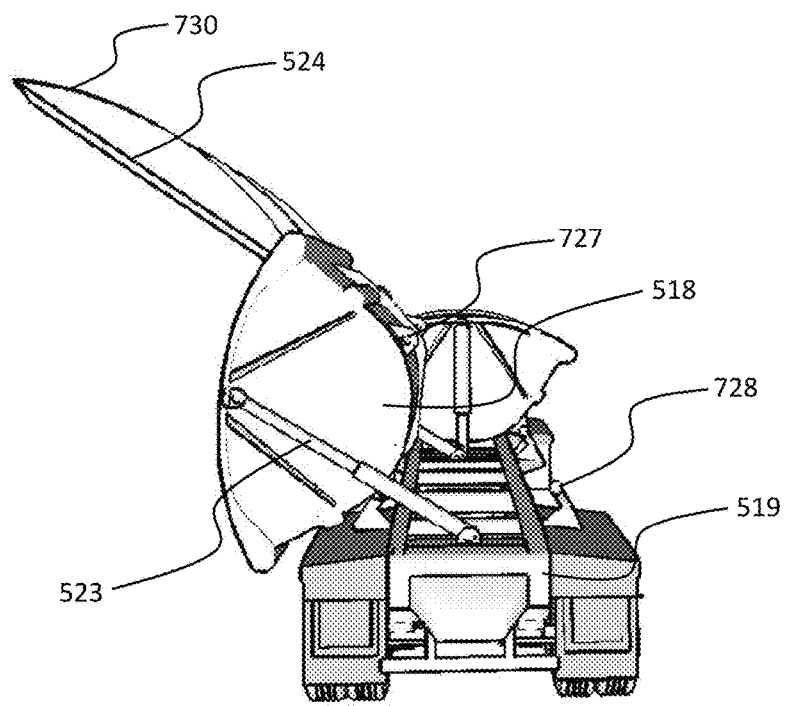

FIG. 7b shows a rear view of the sealed multi-compartment side dump transport vessel with the sealed lid section (524) open and a removably attached container in a tipped unloading position. The two halves of the locking system (727 and 728) secure the container (518) to the trailer frame (519) at all times other than when it is in the tipped unloading position.

Use of the embodiment described within begins when the driver arrives at a predetermined location to accept a load of unstabilized drilling waste. The driver would first remove or deactivate the sealed lid section (524) locking mechanism(s) (not shown) on each container (518) on the trailer so that the sealed lid section of each container can be raised to facilitate loading. The hydraulic cylinder (729) would be activated by using a hydraulic valve (not shown) located a safe distance away from the moving components. The onsite [loader or excavator] (not shown) would begin loading the waste into each container (518).

Figure 6A:
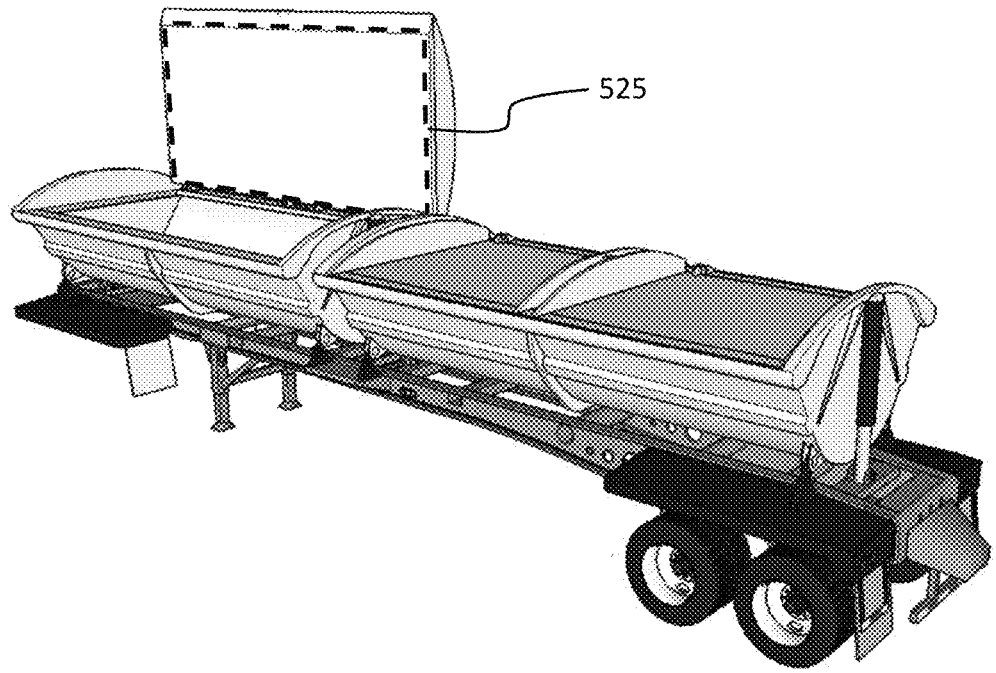
FIGS. 6a and 6b are illustrations of an embodiment of a sealed multi-container side dump vessel as described herein.
Figure 6B:
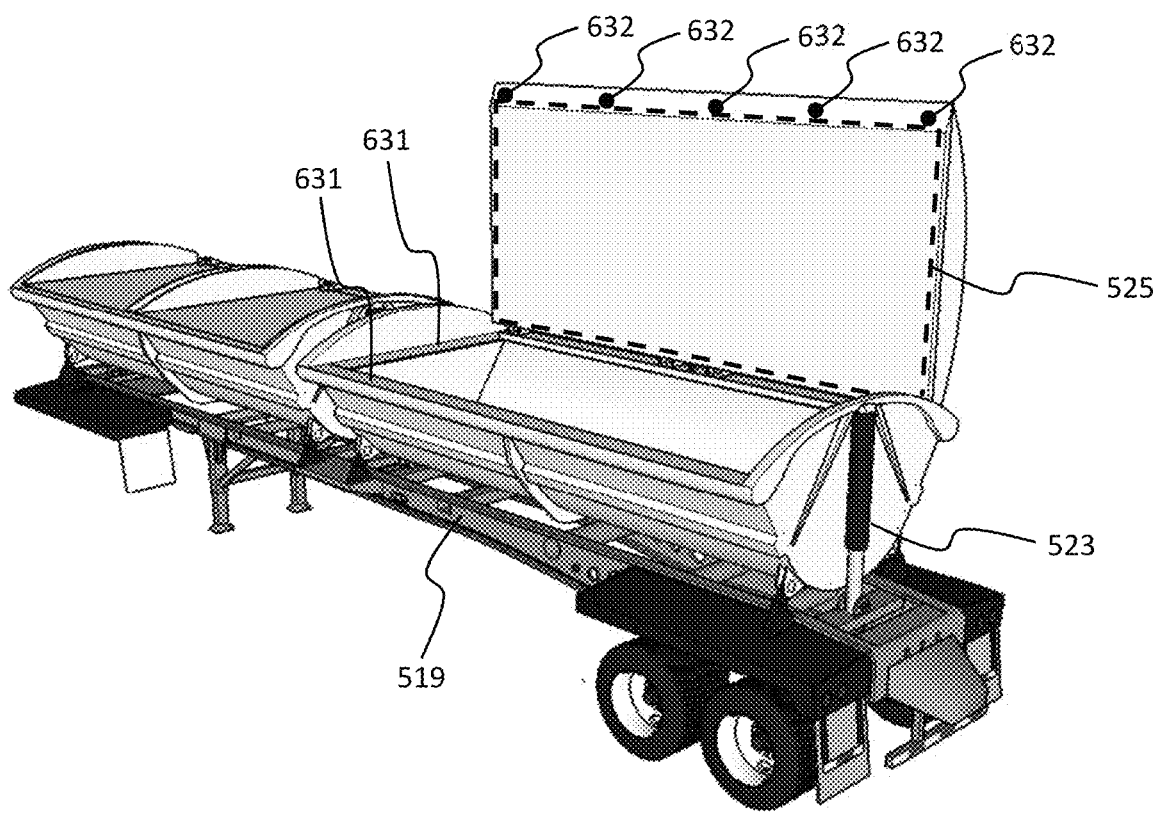

Once the multi-container side dump transport trailer is loaded to the satisfaction of the driver, the driver will again cycle the valve and cause the hydraulic cylinder(s) (729) to move each sealed lid section (524) to contact the transport container walls and sealing section (631). The lid locking mechanism(s) (not shown) on each container would be tightened so that the contents within each container (518) are secured and ready for transport. The figures illustrate that a single centrally located hydraulic cylinder (729) is used to open and close the lid, but the location and the number of hydraulic cylinder(s) (729) that are required to move the lid section (524) from an open to closed, or closed to open position is dependent on the weight of the sealed lid section, and capacity of the hydraulic cylinders installed and therefore, of less importance to the details within other than to say one or more hydraulic cylinders would be required to operate the sealed lid section safely. The location of the valve that closes the sealed lid section is typically located where it's both convenient and safe for the driver to operate. While the hydraulic cylinders could cause the sealed lid section to remain in a closed and sealed position, the driver would additionally lock the sealed lid section in place using a locking mechanism (not shown), for example, wing nuts and bolts to ensure it cannot become removably detached, even if the transport trailer (517) were to overturn while moving down a roadway or transport corridor. Wing nuts and bolts, or an air or hydraulic locking mechanism would be selected from those otherwise readily available to those knowledgeable in manufacturing transport vessels. Given the locking mechanism is conventional and readily available, it has not been included in the figures. The typical location of a locking mechanism (632) is shown in FIGS. 6b and 7a.

The driver would generate a waste manifest or bill of lading to document the location from where the waste originated (for example, a legal land description), as well as the type and quantity of waste (for example, "9 cubic meters of brine contaminated drilling waste in containers A and 8 cubic meters of oil base contaminated drilling waste in containers B"). The requirements of a waste manifest or bill of lading is determined by local regulators. Upon arrival at the waste treatment facility, the driver would provide the facility a copy of the waste manifest or bill of lading so that the waste treatment facility operator knows which tank should be utilized for short term storage of the waste product, before treatment of the drilling waste.

To unload the contents in the containers, the driver would first move the transport truck and multi-container trailer to the desired unloading bin (not shown). For example, if the driver has oil base contaminated drilling waste in a container B, the driver would unlock the locking mechanism of such container B which secures the sealed lid section to the container sealing section (and then tip such container B into the oil base contaminated drilling waste receiving bin).

The hydraulic cylinders (729) which move the sealed lid section into a substantially vertical position would be extended, so that a single container of the transport trailer can begin the relatively simple unloading procedure. The driver would unlock the locking clamps (727 and 728) that secure the container in a horizontal position. The locking clamps are not critical to the safe operation of the transport trailer during movement down a roadway because the large hydraulic cylinder(s) (523) that move the container (518) from a load to unload position would cause the transport trailer (519) to otherwise remain secure. However, it is a reasonable and safe practice to include locking mechanisms (727 and 728), selected from those otherwise readily available to those skilled in manufacturing transport vessels. Once the locking clamps are unlocked, the valve would be activated which would cause the hydraulic cylinder(s) (523) to extend, moving the substantially moon shaped container from its horizontal transport position to a vertical unloading position, as shown, for example, in FIG. 8. The hinge mechanism (522) connects the container to the trailer frame and the container pivots on the hinges. The location of the valve that moves the transport trailer into a vertical position would be typically installed by the manufacturer of the transport container at a location convenient and safe for the driver to operate.

Figure 8:
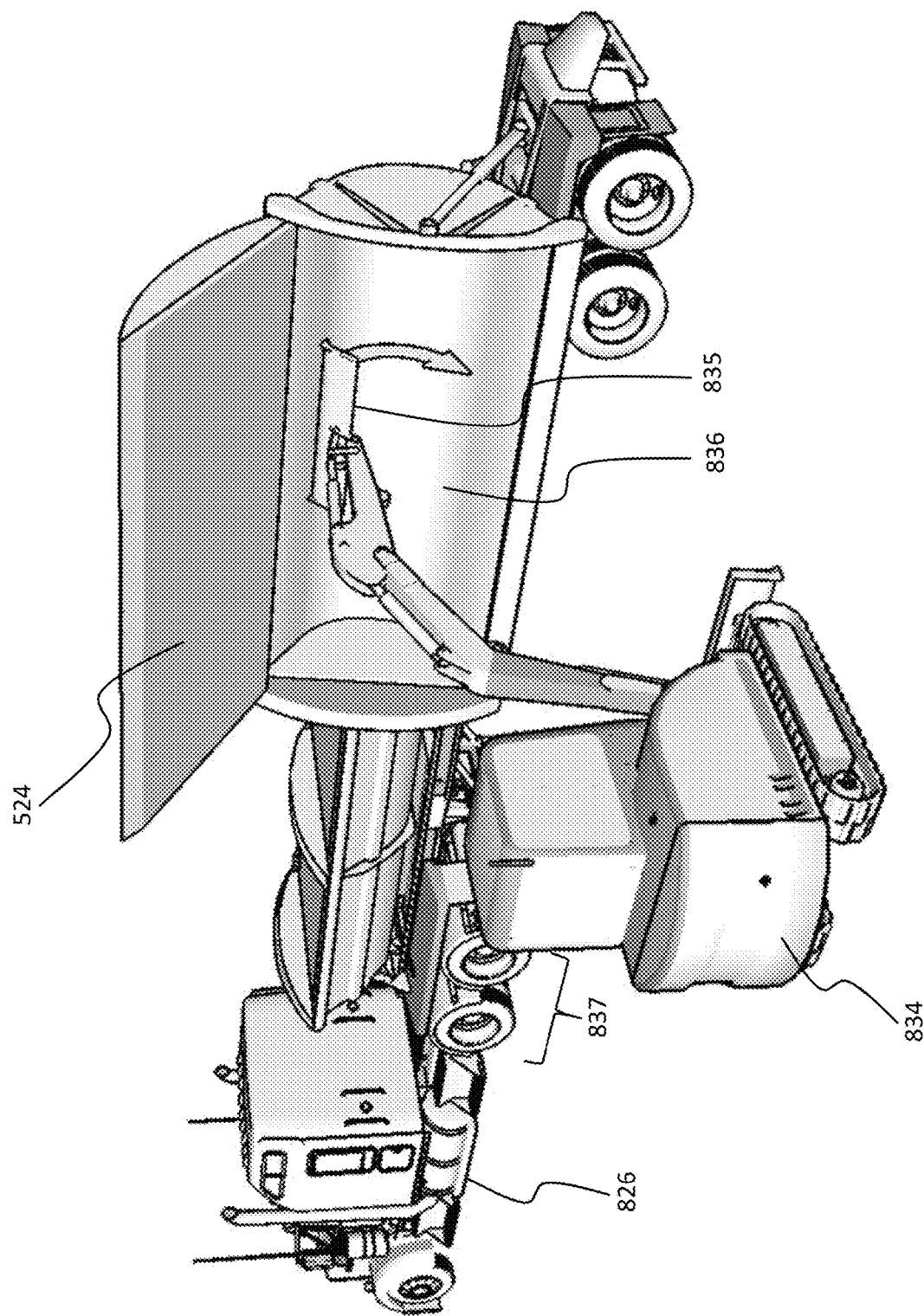
FIG. 8 is an illustration of an embodiment of a sealed multi-container side dump vessel as described herein.

As demonstrated, for example, in FIGS. 7a, 7b and 8, the container(s) (518) is shown in its unloading or emptying position for removing or dumping the transported cuttings, with the sealing lid (524) shown in its open, non-sealing position. The sealed lid section would match the opening in both size and shape to provide the necessary sealing surface. The sealed lid section is typically one piece and can be flat or arched, or include arched shaped reinforcements for added structural rigidity (730).

Once the unstabilized drill cuttings waste have been unloaded, the valve can again be activated to move the empty container from its vertical unloading position back to a horizontal position, followed by activating the hydraulic lid rams (729) which hold the lid section (524) in a vertical position, back to a horizontal position. Alternatively, the driver can also take advantage of the vertical nature of transport vessel (FIG. 8) to first close the sealed lid section (524) and secure the sealed lid section locking mechanism(s)

(not shown) while remaining at the safety of ground level. Once the hydraulic ram(s) (523) have moved each container back to a horizontal position, the locking clamps (727 and 728) can be locked and the sealed multi-container side dump transport trailer (517) is ready to be redeployed.

Regardless of the contents of the containers on a trailer being the same or different, best practices would dictate that only one container be unloaded at a time, which would reduce or prevent the possibility of tipping the truck and trailer combination, or fracturing the trailer, as a result of the stresses of additional weight over the side of a side dump trailer design.

The viscous or sticky nature of oil base or salt base unstabilized drill cuttings can cause the cuttings to become stuck, whether frozen in place or compacted in a corner/seam of the transport vessel. Given the unloading takes place along the side of the side dump (rather than in a vertical orientation), the driver could manually clean the containers using a shovel, or scraper, or pressurized wash water. These are not practical options with a vertical dump vessel because, a shovel or scrapper would require the driver to reach up to 40 feet into the vertical vessel at an awkward angle. Optionally, the openness of the side dump trailer would allow for a piece of motorized equipment for example a mini-excavator (834) equipped with a scraper (835) to reach in and gently drag along the bottom/floor section (836) of the moon substantially moon shaped container (518) so that the compacted, viscous or sticky material could be removed from the container(s).

It is important to mention that the shorter length of the containers disclosed herein, compared to the larger size of a single container disclosed in commonly owned U.S. patent application Ser. No. 15/252,967, would naturally be stronger given there is a shorter span across the area where cargo weight will be supported and most importantly, while unloading, the side of the container will be under far less stress than a longer length container holding substantially more cargo.

Further, given the opportunity for the driver to clean each container after use, reusing the same transport trailer to haul cleaned drilling waste to a recycling depot or landfill is presented, while not contaminating the cleaned drilling waste with residual contaminants from the unstabilized drilling waste. Additionally, given the cleaned drilling waste is likely to be substantially dry (lacking water base or oil base contamination) as a result of a solvent wash process or low temperature thermal process, the ability of the container to seal and prevent such things as wind induced by highway travel speeds to be able to blow the cleaned drilling waste out of the container is clearly advantageous.

The methods and apparatus described herein meet the challenges described above, including, among other things, achieving more efficient and effective drill cutting transport and processing, including prevention, spillage or loss of drill cuttings when the vessel is in a position other than horizontal, e.g., accident, overturn or other upsetting of the transport vessel during transport. Of course during filling and emptying of the vessel, the removably attached lid and end sealing sections would be operated so as to allow filling and emptying.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. At least one transport trailer for transporting unstabilized drill cuttings comprising liquids and solids or cleaned drill cuttings containing a reduced amount of liquids, the transport trailer comprising:
    at least two container bodies configured to contain the unstabilized or cleaned drill cuttings,
        wherein each container body has a width and a length, the length being equal to or greater than the width, and has two side sections uniformly connected through a smoothly transitioning floor section not at right angles to the side sections, and having a front wall section and a rear wall section, wherein the two side sections, floor section, front wall section and rear wall section have interior surfaces that define an interior volume of each container body, and wherein the interior volume is unobstructed and undivided between the front wall section and the rear wall section and between the two side sections,
        wherein each container body is configured to tilt along its length around a horizontal axis to empty the unstabilized or cleaned drill cuttings from the container body;
    at least two sealing lid sections covering the at least two container bodies, each liquid sealing lid section being removably attached to a top of a corresponding container body to facilitate filling and emptying of the container body with the unstabilized or cleaned drill cuttings;
    at least one frame section attached to and supporting each of the at least two-container bodies; and
    at least two axles attached to the at least one frame section,
    wherein the transport trailer is configured to provide stable transport of unstabilized or cleaned drill cuttings absent leakage, loss or spillage of liquids or solids from the containers during transport or when the containers are in a position other than horizontal and the lid sections are closed.

2. The transport trailer of claim 1 having at least three containers on each transport trailer.

3. The transport trailer of claim 2 having an internal volume of up to about 9 cubic meters for each container that is attached to the trailer frame.

4. The transport trailer of claim 1 configured to contain about 2 to about 3 cubic meters per axle.

5. The transport trailer of claim 3 including 3 axles.

6. The transport trailer of claim 1 wherein the container body is removably attached to the axles through rails which allow the container body to empty its load over the side of the transport trailer.

7. The transport trailer of claim 1 wherein the unstabilized drill cuttings are oil base mud drill cuttings or water containing salt base drill cuttings.

8. The transport trailer of claim 1 wherein the axles are positioned so as to provide a substantially equal weight distribution of unstabilized drill cuttings on each axle during transport.

9. The transport trailer of claim 1 including multiple transport trailers connected in series.

10. A method of transporting unstabilized drill cuttings comprising liquids and solids or cleaned drill cuttings containing a reduced amount of liquids, the method comprising:
    filling the transport trailer of claim 1 with the unstabilized or cleaned drill cuttings;

transporting the filled transport trailer to a pre-determined dumping location; and unloading the unstabilized or cleaned drill cuttings from the container(s), without any leakage of unstabilized or cleaned drill cuttings during transport.

11. The method of claim 10 wherein the unstabilized drill cuttings contain about 20% to about 50% liquids by volume.

12. The method of claim 10 wherein the unstabilized drill cuttings are contaminated with an oil base or brine base mud.

13. The method of claim 10 wherein the unstabilized drill cuttings have been at least partially cleaned using a solvent wash process.

14. The method of claim 10 wherein the unstabilized drill cuttings have been at least partially cleaned using a low temperature thermal process.

15. The method of claim 10 wherein transporting the filled transport trailer includes transporting unstabilized drill cuttings in a first direction and transporting cleaned drill cuttings in a second direction.

16. The transport trailer according to claim 1, wherein one of the container bodies is configured to tilt independently of another one of the container bodies.

17. At least one transport trailer for transporting unstabilized drill cuttings comprising liquids and solids or cleaned drill cuttings containing a reduced amount of liquids, the transport trailer comprising:

at least two container bodies configured to contain the unstabilized or cleaned drill cuttings, wherein each container body has a width and a length, the length being equal to or greater than the width, and has a floor section, two side sections extending upwardly and outwardly from the floor section, and a front wall section and a rear wall section uniformly connected to the two side sections, each container body extending along a longitudinal axis from the front wall section to the rear wall section, wherein the two side sections, floor section, front wall section and rear wall section have interior surfaces that define an interior volume of each container body, and wherein the interior volume is unobstructed and undivided between the front wall section and the rear wall section and between the two side sections, wherein each container body is configured to tilt along its length about the longitudinal axis so as to empty the unstabilized or cleaned drill cuttings from the container body;

at least two liquid sealing lid sections covering the at least two container bodies, each liquid sealing lid section being removably attached to a top of a corresponding container body to facilitate filling and emptying of the container body with the unstabilized or cleaned drill cuttings;

at least one frame section attached to and supporting the at least two container bodies;

at least two axles attached to the frame section, wherein the transport trailer is configured to provide stable transport of the unstabilized or cleaned drill cuttings absent leakage, loss or spillage of liquids or solids from the containers during transport or when the containers are in a position other than horizontal and the lid sections are closed.

* * * * *